US007587628B2

(12) United States Patent
Ashour et al.

(10) Patent No.: US 7,587,628 B2
(45) Date of Patent: Sep. 8, 2009

(54) SYSTEM, METHOD AND COMPUTER PROGRAM PRODUCT FOR COPYING DATA

(75) Inventors: Gal Ashour, Yokne'am (IL); Olympia Gluck, Haifa (IL); Noa Privman Horesh, Zichron Yaakov (IL); Aviad Zlotnick, Mitzpeh Netofah (IL)

(73) Assignee: International Business Machines Corporation, Armonk, NY (US)

( * ) Notice: Subject to any disclaimer, the term of this patent is extended or adjusted under 35 U.S.C. 154(b) by 390 days.

(21) Appl. No.: 11/533,398

(22) Filed: Sep. 20, 2006

(65) Prior Publication Data

US 2008/0072001 A1 Mar. 20, 2008

(51) Int. Cl.
*G06F 11/00* (2006.01)

(52) U.S. Cl. .......................................... 714/6; 711/162

(58) Field of Classification Search ....................... None
See application file for complete search history.

(56) References Cited

U.S. PATENT DOCUMENTS 5,657,440 A 8/1997 Micka
5,835,953 A * 11/1998 Ohran ........................ 711/162
6,397,307 B2 * 5/2002 Ohran ........................ 711/161
6,557,089 B1 * 4/2003 Reed et al. .................. 711/162
6,934,725 B1 * 8/2005 Dings ......................... 707/204
6,957,362 B2 10/2005 Armangau
7,069,466 B2 * 6/2006 Trimmer et al. ................ 714/6
7,127,578 B2 * 10/2006 Nagata ....................... 711/162
2003/0126387 A1 7/2003 Watanabe
2005/0071708 A1 3/2005 Bartfai
2007/0198791 A1 * 8/2007 Iwamura et al. ............. 711/162
2008/0172572 A1 * 7/2008 Beardsley et al. .............. 714/6

FOREIGN PATENT DOCUMENTS

WO WO2004019214 3/2004

* cited by examiner

*Primary Examiner*—Christopher S McCarthy

(57) ABSTRACT

A method, system and computer program product for copying data are provided. The method includes: establishing a virtual copying relationship at a current primary site; and establishing a real copying relationship with a first remote site in response to a reception of a first remote site information by the current primary site information while maintaining the virtual copying relationship.

30 Claims, 10 Drawing Sheets

SYSTEM, METHOD AND COMPUTER PROGRAM PRODUCT FOR COPYING DATA

FIELD OF THE INVENTION

The present invention relates to methods, systems and computer program products for copying data.

BACKGROUND OF THE INVENTION

The importance of data has increased during the last decade while the cost of data storage medium has decreased, thus motivating data storage vendors to provide data protection schemes that are based upon duplication of data.

One of these protection schemes is known as mirroring. Mirroring involves repetitively generating one or more duplicates of data. A real copying relationship can be established between one production (or primary) site and one or more remote (or secondary) sites. In a multiple remote site environment data from a single production site is mirrored on multiple remote sites.

The following patent and patent application, all being incorporated herein by reference provide various example of some state of the art data protection schemes: U.S. Pat. No. 6,957,362 of Armangau, U.S. patent application publication serial number 2005/0071708 of Bartfai et al. and U.S. patent application publication serial number 2003/0126387 of Watanabe.

An establishment of a real copying relationship between a primary site and a remote site requires that the primary site receives remote site information that may include, for example, a remote site address, a remote site identifier, a remote site communication and storage configuration and the like.

Mirroring in a multiple remote site environment as well as in a single remote site environment requires a synchronization process that can be time consuming.

A multiple remote site environment is more robust than a single remote site environment. Once the primary site fails one of the remote sites becomes (at least until the primary site is recovered) a current primary site.

In many cases the current primary site is not aware of all the remote site information, and a learning period is required for gaining the remote site information. During this learning period the current primary site can request the remote site information from the remote sites.

In various prior art solutions, once the learning period ends the current primary site performs a full-volume synchronization during which it sends its entire content to the remote sites.

There is a need to provide efficient methods, systems and computer program products for copying data.

SUMMARY OF THE PRESENT INVENTION

In accordance with a first aspect of the present invention a computer program product and a method for copying data are provided. The method includes: establishing a virtual copying relationship at a current primary site; and establishing a real copying relationship with a first remote site in response to a reception of a first remote site information by the current primary site information while maintaining the virtual copying relationship.

Conveniently, the method includes establishing a real copying relationship with a second remote site in response to a reception of a second remote site information by the current primary site.

Conveniently, the method includes tracking changes of data stored in the current primary site.

Conveniently, the establishing of a real copying relationship with a remote site is followed by tracking changes of data stored in the current primary site that occur after the establishment of the real copying relationship.

Conveniently, the establishing of a virtual copying relationship at a current primary site is responsive to a reception of an establish virtual copying relationship command.

Conveniently, the method includes terminating the virtual copying relationship after the current primary site establishes real copying relationships with all the target sites.

Conveniently, the method includes establishing a virtual copying relationship immediately after another primary site fails.

Conveniently, the method includes establishing a real copying relationship with the other primary site after the other primary site recovers.

In accordance with a second aspect of the present invention a system for copying data is provided. The system includes a current primary site, wherein the current primary site comprises a controller coupled to at least one storage unit; wherein the controller is adapted to establish a virtual copying relationship, and to establish a real copying relationship with a first remote site in response to a reception of a first remote site information by the current primary site information while maintaining the virtual copying relationship.

In accordance with a third aspect of the present invention a computer program product and a method for copying data are provided. The method includes: initializing, in response to a reception of an establish virtual copying relationship command, a first data structure representative of changes of data stored at a current primary site; and establishing a real copying relationship with a first remote site in response to a reception of a first remote site information while maintaining the first data structure; wherein the establishing comprises maintaining a second data structure indicative of data portions that should be copied from the current primary site to the first remote site.

In accordance with a fourth aspect of the present invention a system for copying data is provided. The system includes a current primary site, wherein the current primary site comprises a controller coupled to at least one storage unit; wherein the controller is adapted to initialize a first data structure representative of changes of data stored at a current primary site in response to a reception of an establish virtual copying relationship command; and to establish a real copying relationship with a first remote site in response to a reception of a first remote site information by the current primary site information while maintaining the first data structure; wherein the establishing comprises maintaining a second data structure indicative of data portions that should be copied from the current primary site to the remote site.

BRIEF DESCRIPTION OF THE DRAWINGS

The present invention will be understood and appreciated more fully from the following detailed description taken in conjunction with the drawings in which.

DETAILED DESCRIPTION OF THE DRAWINGS

Figure 1:
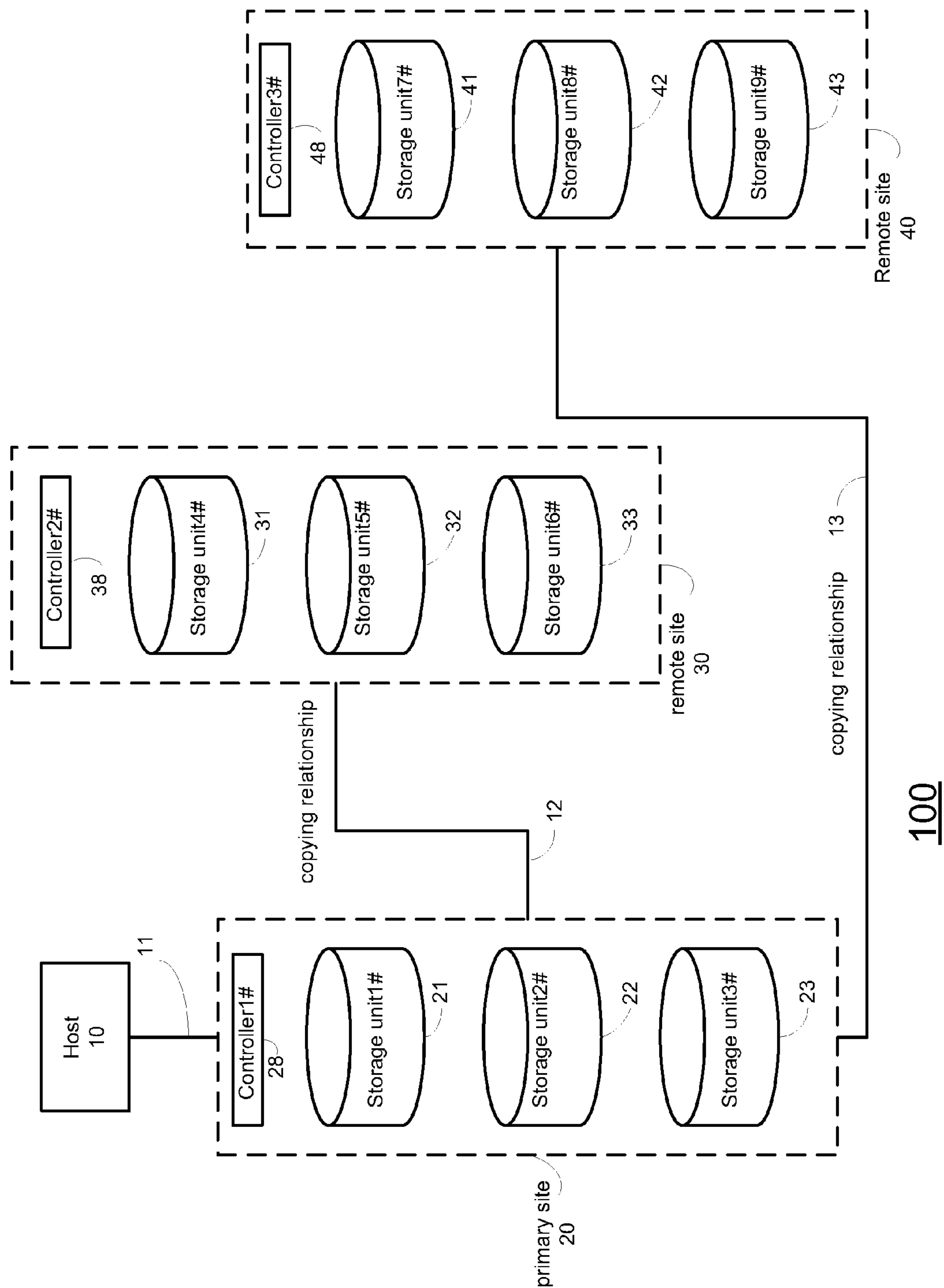
FIG. 1 illustrates a multiple remote site environment, according to an embodiment of the invention.

Methods, systems and computer program products for copying data are provided. Conveniently, once a primary site fails a current primary site is selected and that current primary site can immediately establish a virtual copying relationship. Once that current primary site receives remote site information it can establish a real copying relationship with that remote site. Conveniently, the virtual copying relationship is maintained until a predefined termination event occurs. Typically the termination occurs after all the remote sites as well as a recovered primary site establish real copying relationships with the current primary site.

A copying relationship can be a mirroring relationship but this is not necessarily so. An example of a copying relationship that is not a mirroring relationship is explicitly provided in FIG. 10 that illustrates a method that includes establishing a virtual copying relationship between a future source volume (that may be a primary site or may be included in a primary site) and between a virtual target.

It is noted that once a real copying relationship is established information can be copied.

Conveniently, the establishment of the virtual copying relationship involves tracking data changes that occur after the primary site failed. The virtual copying relationship can be established at the current primary site even if the current primary site is not aware of any remote site information or even if only some of the remote site information is known.

According to an embodiment of the invention if the current primary site can communicate with N remote sites then the current primary site maintains (N+1) data structures, whereas a first data structure is associated with the establishment (and maintenance) of the virtual copying relationship and N data structures are associated with the N remote sites.

Conveniently, a data structure associated with a certain site (out of a remote site or the primary site) is initialized when a real copying relationship is established between the current primary site and that certain site. The initialization includes copying the content of the first data structure associated with the virtual copying relationship at the moment that real mirror connection is established.

Conveniently, each data structure that is associated with a certain site reflects which data portion (such as a data track, a data block, a data section and the like) should be copied from the current primary site to the certain site. This data structure is updated in response to changes in the data stored at the current primary site and to data portions that were transferred to the certain site.

Conveniently, when the host writes to the current primary site the current primary site should update up to N+1 data structures such as to reflect these write operation.

According to an embodiment of the invention the various remote sites and even primary sites include storage units that are included within a multiple storage unit system, such as but not limited to the TotalStorage Enterprise Storage Server (ESS) of IBM™.

It is further noted that once a real copying relationship is established data can be copied from one site to another by using synchronous copying techniques, asynchronous copying techniques or a combination thereof. One prior art asynchronous remote data copying system and method is illustrated at U.S. Pat. No. 5,657,440 of Micka et al. that is incorporated herein by reference.

According to an embodiment of the invention a system for copying data in a multiple remote site environment is provided. The system includes a current primary site, wherein the current primary site includes a controller that is connected to at least one storage unit. The temporal storage unit is adapted to (i) establish a virtual copying relationship immediately after a primary site fails, and to (ii) establish a real copying relationship with a first remote site in response to a reception of a first remote site information (by the current primary site information) while maintaining the virtual copying relationship.

The following methods, systems and computer readable products can be applied in multiple remote site environments, in single remote site environments, in response to a failure of a primary site, or in order to speed up a synchronization process that is initialized regardless of a failure of a primary site. Only for simplicity of explanation the following figures illustrate multiple remote site environments and virtual copying processes that are initialized after a failure of a primary site.

FIG. 1 illustrates multiple remote site environment 100, according to an embodiment of the invention.

FIG. 1 illustrates two remote sites although the invention can be applied mutatis mutandis in environments that include a single remote site or more than two remote sites.

Environment 100 includes host 10, primary site 20, remote sites 30 and 40. It is assumed that these components are functional. Host 10 communicates with primary site 20, as indicated by line 11. Primary site 20 maintains real copying relationships with remotes sites 30 and 40, as indicated by lines 12 and 13.

Environment 100 or only a portion of this environment can be regarded as a system for copying data in a multiple remote site environment. For example, the system can include remote site 30. Yet for another example, the system can include remote site 30 as well as one or more links or channels between remote site 30 and between remote site 40, host 10 and primary site 20.

According to an embodiment of the invention the system can be adapted to mirror data in a multiple remote site environment. The system includes a current primary site that includes a controller that is connected to at least one storage unit that can form one or more sites. The controller is adapted to (i) immediately initialize a first data structure representative of changes of data stored at a current primary site in response to a reception of an establish virtual copying relationship command, and to (ii) establish a real copying relationship with a first remote site in response to a reception of a first remote site information by the current primary site information while maintaining the first data structure. The establishing includes maintaining a second data structure indicative of data portions that should be copied from the current primary site to the remote site.

Referring back to FIG. 1, each site includes three storage units, but this is not necessarily so. Primary site 20 includes a controller ("controller #1") 28, and three storage units ("storage unit #1", "storage unit #2" and "storage unit #3") 21-23. Remote site 30 includes a controller ("controller #2") 38, and three storage units ("storage unit #4", "storage unit #5" and "storage unit #6") 31-33. Remote site 40 includes a controller ("controller #3") 48, and three storage units ("storage unit #6", "storage unit #8" and "storage unit #9") 41-43.

Each storage unit can include a disk, but this is not necessarily so.

Remote site 30, when operating as a current primary site, maintains multiple data structures. These data structures can be stored within any storage unit of storage units 31-33, within controller 38 or within another memory unit, such as but not limited to an internal cache memory unit (not shown) of remote site 30.

It is noted that the maintenance of the real copying relationship can include performing continuous (or at least frequent) copies of data within primary site 20 to remote sites 30 and 40. Various prior art copying schemes can be applied.

It is further noted that the number of remote sites can exceed two, that the data source can differ from host 10, and that the various components can be connected to each other by various links, networks and the like. It is further noted that additional data protection schemes can be applied. These data protection schemes include using non-volatile memories, duplicating the primary site and at least one remote site and the like. Redundant power supply units as well as other components can also be used.

Figure 2:
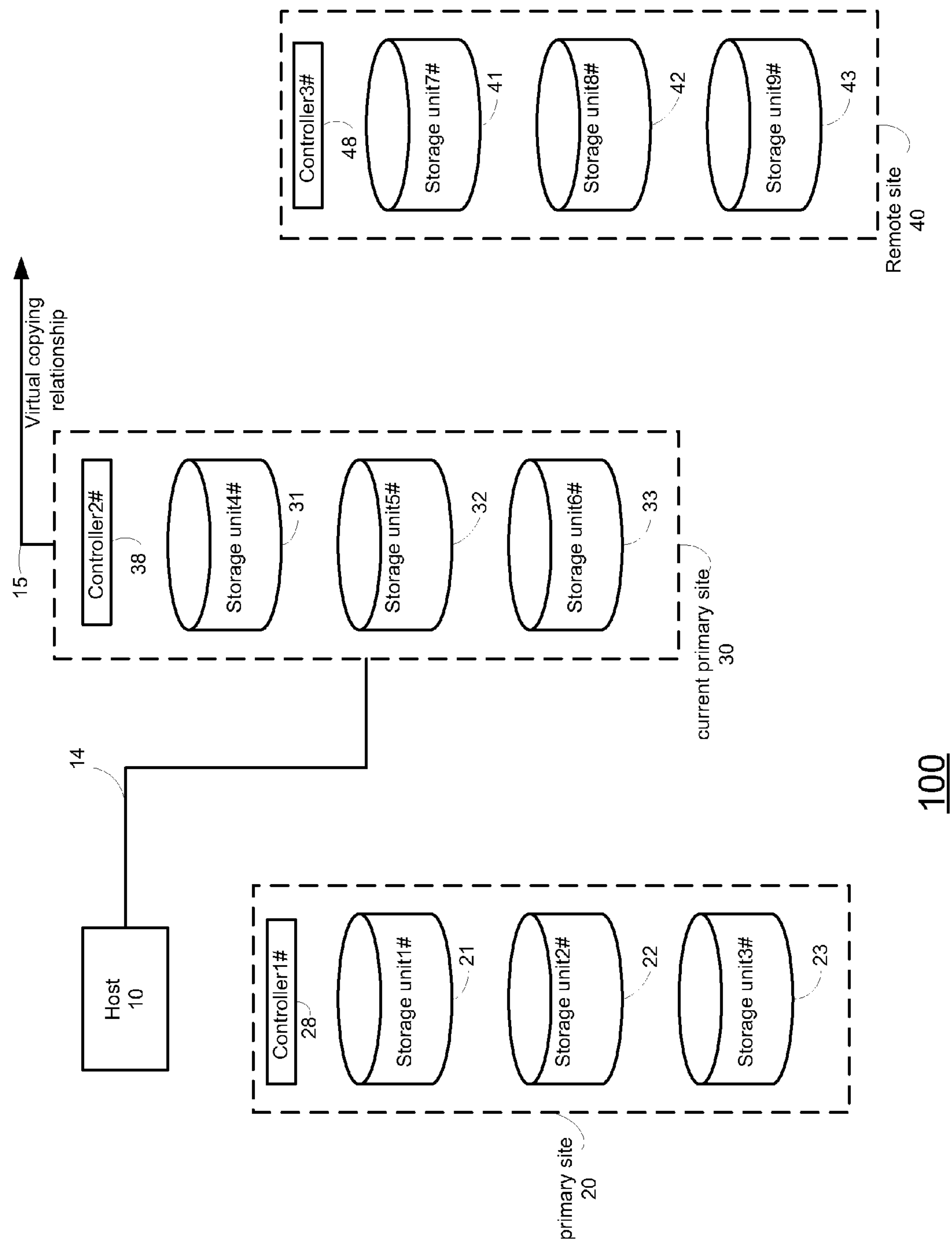
FIG. 2 illustrates a multiple remote site environment immediately after a primary site failed, according to an embodiment of the invention.

FIG. 2 illustrates multiple remote site environment 100 immediately after primary site 20 failed, according to an embodiment of the invention.

Immediately after primary site 20 failed remote site 30 becomes current primary site 30. It is noted that the failure may be followed by a very quick selection process of the current primary site. It is further noted that although in many cases the selection is predefined.

FIG. 2 illustrates environment 100 after an establish virtual copying relationship command is generated by controller 38, by host 10 or by any other component of environment 100. It is noted that this establish virtual connection command can be provided by primary site 20 if it is still able to generate such a command.

Current primary site 30 establishes (conveniently but not necessarily immediately establishes) a virtual copying relationship (illustrated by virtual link 15 and can receive data from host 10, as indicated by link 14.

It is noted that the virtual copying relationship can be established before the current primary site 30 is aware of the remote site information associated with remote site 40.

Figure 6:
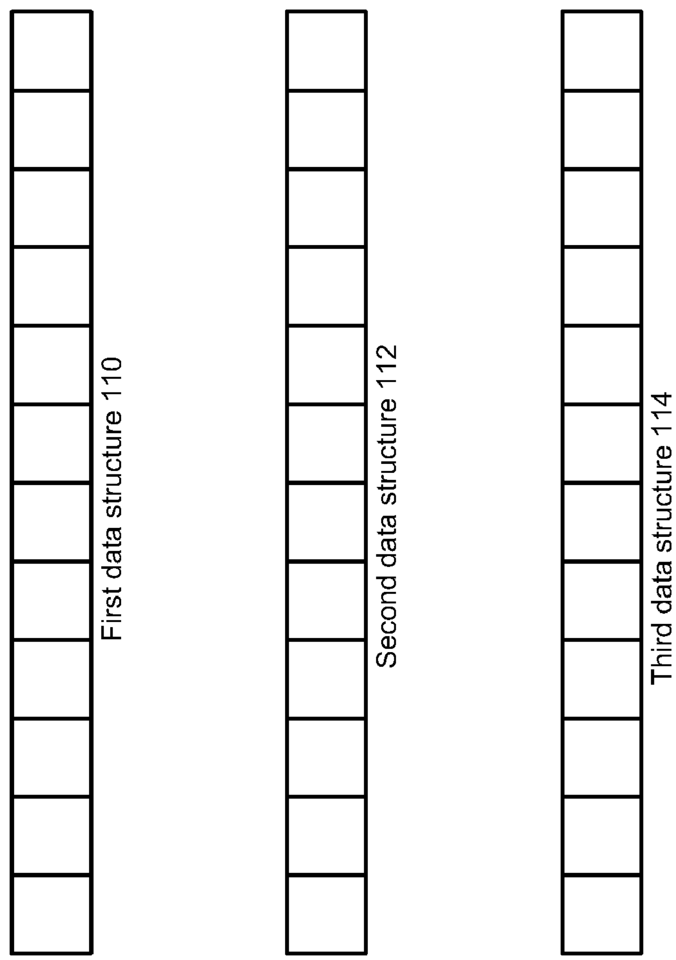
FIG. 6 illustrates three data structures, according to an embodiment of the invention.

The establishment of the virtual copying relationship includes maintaining a data structure, such as first data structure 110 of FIG. 6, that tracks data changes in current primary site 30. The first data structure 110 can be a bit map whereas each bit represents a data portion that is changed by host 10 after the virtual copying relationship is established.

It is noted that an establish virtual copying relationship command can have various formats, usually responsive to the instruction format of the processor that has to execute this command. Various fields, flags or control bits can be used to indicate that a virtual relationship should be established. The establish virtual copying command can resemble the establish real copying relationship command but this is not necessarily so.

Figure 3:
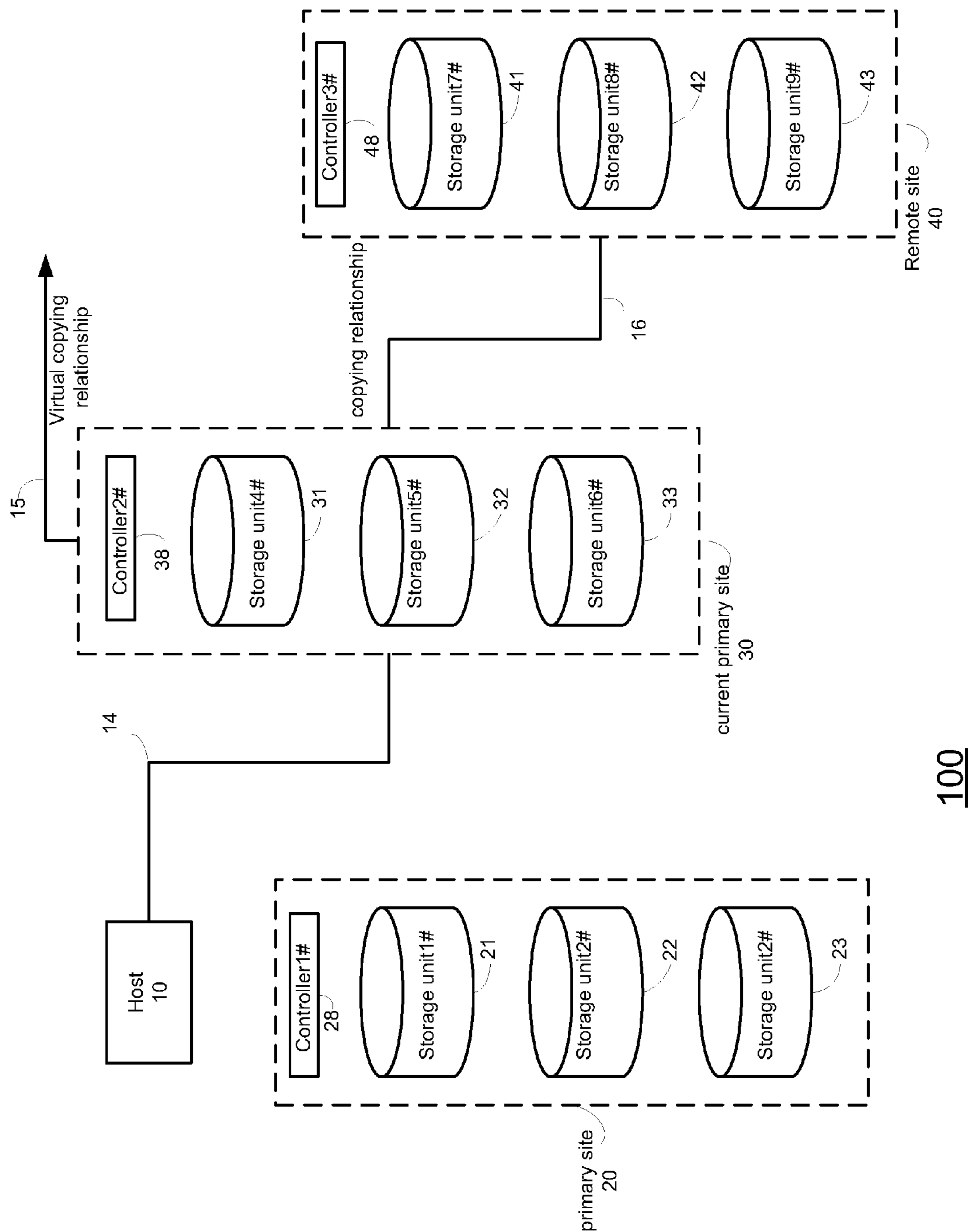
FIG. 3 illustrates a multiple remote site environment after a real copying relationship is established between a current primary site and between a remote site, according to an embodiment of the invention.

FIG. 3 illustrates multiple remote site environment 100 after a real copying relationship is established between current primary site 30 and between remote site 40, according to an embodiment of the invention.

At this stage a real copying relationship is established between current primary site 30 and remote site 40. This relationship is established after current primary site 30 receives remote site 40 information.

The establishment of this real copying relationship includes maintaining another data structure, such as second data structure 112 of FIG. 6, that indicates which data portions should be sent from current primary site 30 to remote site 40. The second data structure can be a bit map whereas each bit represents a data portion that should be copied to remote site 40.

Figure 4:
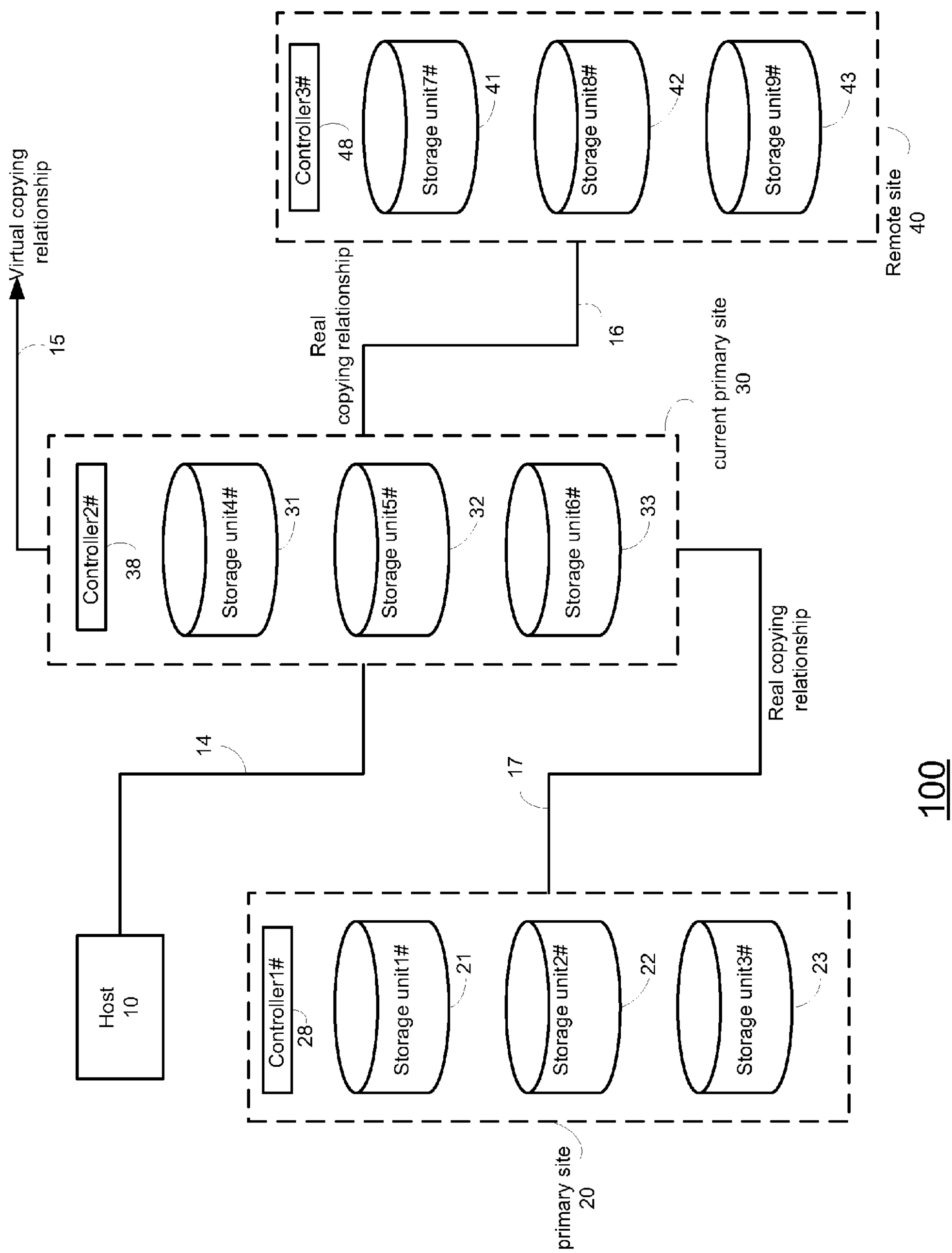
FIG. 4 illustrates a multiple remote site environment after real copying relationships are established between the current primary site and between the remote site and the primary site, according to an embodiment of the invention.

FIG. 4 illustrates multiple remote site environment 100 after real copying relationships are established between current primary site 30 and between remote site 40 and the primary site 20, according to an embodiment of the invention.

The establishment of the real copying relationship between current primary site 30 and primary site 20 includes maintaining a further data structure, such as third data structure 114 of FIG. 6, that indicates which data portions should be sent from current primary site 30 to primary site 20. The third data structure 114 can be a bit map whereas each bit represents a data portion that should be copied to primary site 20.

Figure 5:
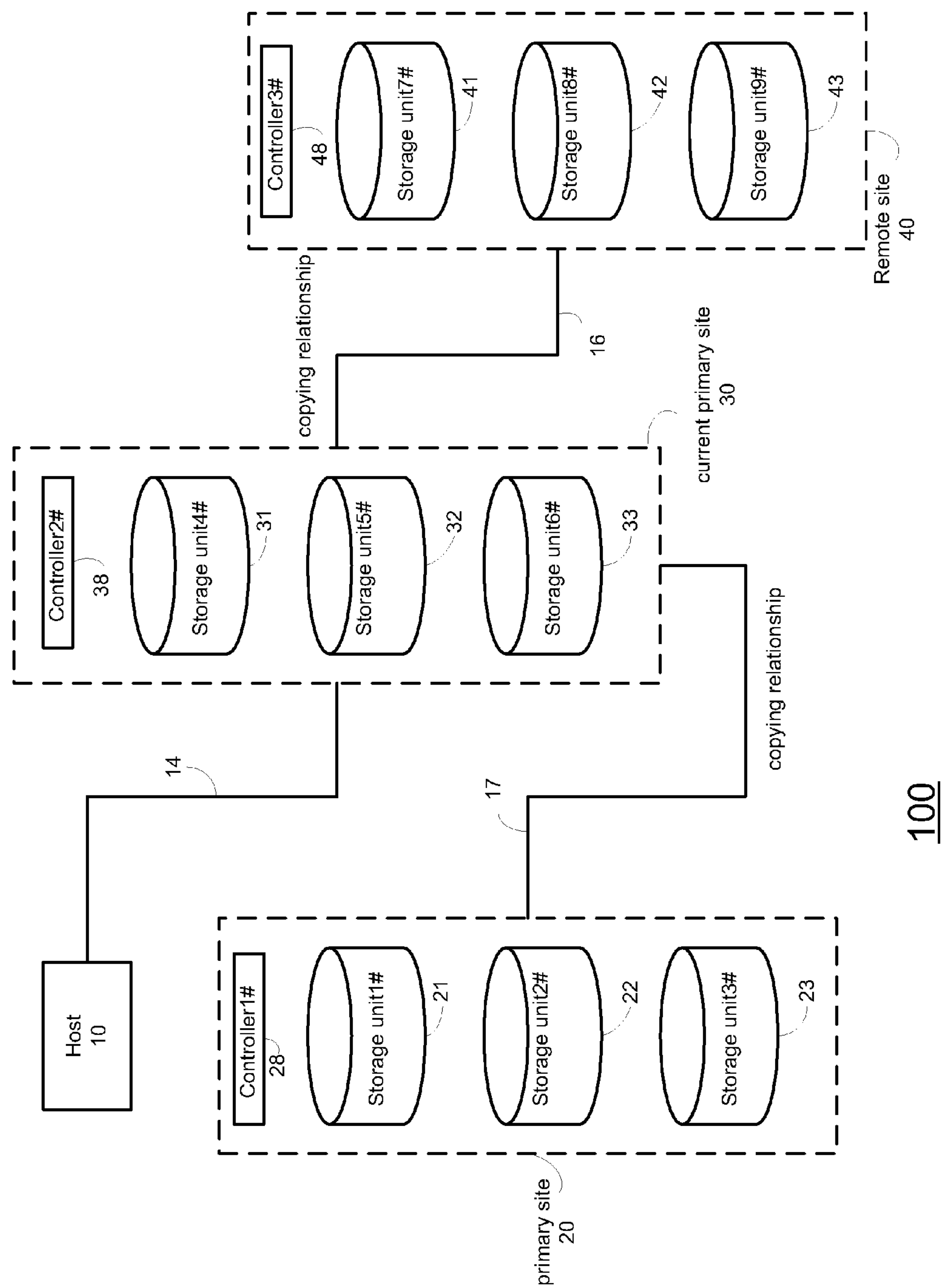
FIG. 5 illustrates a multiple remote site environment after the virtual copying relationship was terminated, according to an embodiment of the invention.

FIG. 5 illustrates multiple remote site environment 100 after the virtual copying relationship was terminated, according to an embodiment of the invention.

The termination can be responsive to a termination command, to an establishment of real mirror relations between current primary site 30 and remote site 40 as well as to primary site 20. Primary site 20 can act as a remote site of temporal remote site 30, but it can function as a primary site while current primary site resumes its activity as a remote site of primary site 20.

FIG. 6 illustrates three data structures, according to an embodiment of the invention.

As illustrated above a first data structure, such as data structure 110 can track changes in data stored within the current primary site while other data structures (112 and 114) can indicate which data portions should be copied from the current primary site to another site.

TABLE 3 illustrates an exemplary scenario of data update operations and the content of three exemplary data structures 110-114. For simplicity of explanation the following table will illustrate three bits of each data structure that correspond to exemplary data tracks denoted DT1-DT3. TPS is a temporal remote site 30 and RS is a remote site.

TABLE 1

| Operation | Three bits of first data structure 110 | | | Three bits of second data structure 112 | | | Three bits of third data structure 114 | | |
|---|---|---|---|---|---|---|---|---|---|
| Establish virtual copying relationship | 0 | 0 | 0 | | | | | | |
| Host writes data to DT1 of TPS 30 | 0 | 0 | 1 | | | | | | |
| Establish a real copying relationship with RS 40 | 0 | 0 | 1 | 0 | 0 | 1 | | | |
| Host writes data to DT2 of TPS 30 | 0 | 1 | 1 | 0 | 1 | 1 | | | |

TABLE 1-continued

| Operation | Three bits of first data structure 110 | | | Three bits of second data structure 112 | | | Three bits of third data structure 114 | | |
|---|---|---|---|---|---|---|---|---|---|
| Data from DT1 is copied to RS 40 | 0 | 1 | 1 | 0 | 1 | 0 | | | |
| Establish a real copying relationship with RS 50 | 0 | 1 | 1 | 0 | 1 | 0 | 0 | 1 | 1 |
| Data from DT1 and DT2 is copied to RS 50 | 0 | 1 | 1 | 0 | 1 | 0 | 0 | 0 | 0 |
| Data from DT2 is copied to RS 40 | 0 | 1 | 1 | 0 | 0 | 0 | 0 | 0 | 0 |

Figure 7:
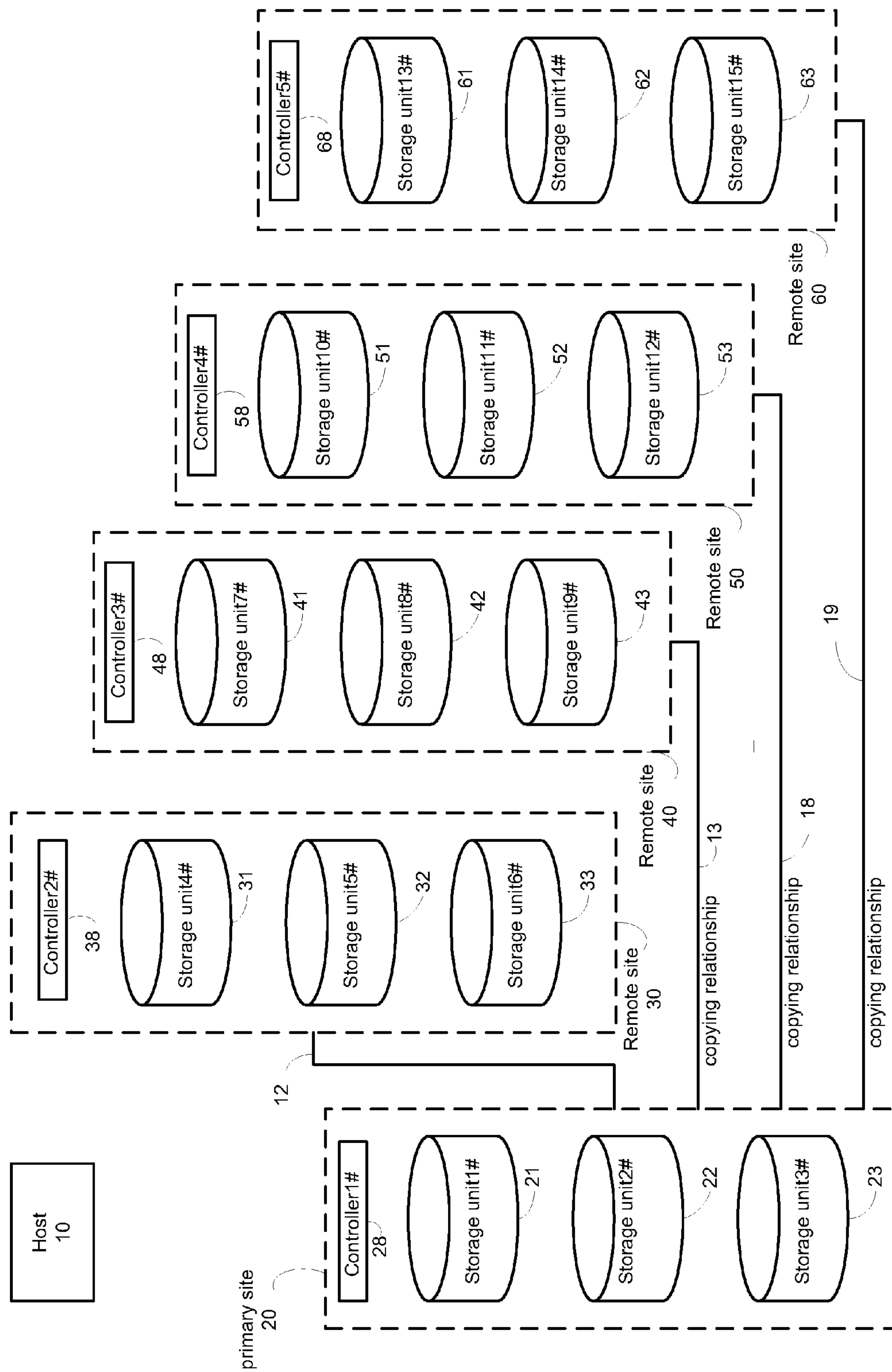
FIG. 7 illustrates a multiple remote site environment, according to another embodiment of the invention.

FIG. 7 illustrates multiple remote site environment 101, according to another embodiment of the invention.

Multiple remote site environment 101 of FIG. 7 differs from multiple remote site environment 100 of FIG. 1 by having two additional remote sites 50 and 60 that have a real copying relationships with primary site 20, as indicated by lines 18 and 19.

Remote site 50 includes a controller ("controller #4") 58, and three storage units ("storage unit #10", "storage unit #11" and "storage unit #12") 51-53. Remote site 60 includes a controller ("controller #5") 68, and three storage units ("storage unit #13", "storage unit #14" and "storage unit #15") 61-63.

It is noted that the copying relationships can be established in a serial manner and not necessarily in a parallel manner, as illustrated in FIGS. 1-5 and 7. Thus, for example, remote site 60 can store data that is a replica of the data stored in remote site 30 that in turn is a replica of data stored in primary site 20. This can be established by establishing a real copying relationship between primary site 20 and remote site 30 as well as establishing a real copying relationship between remote sites 30 and 60.

As soon as one of the other site information is known a real relationship (with partner information) can be established. When the real relationship is established the data that was tracked by the virtual copying relationship will be synchronized to the remote partner along with any new updates. The virtual copying relationship will continue to exist as long as it is not stopped explicitly.

Figure 8:
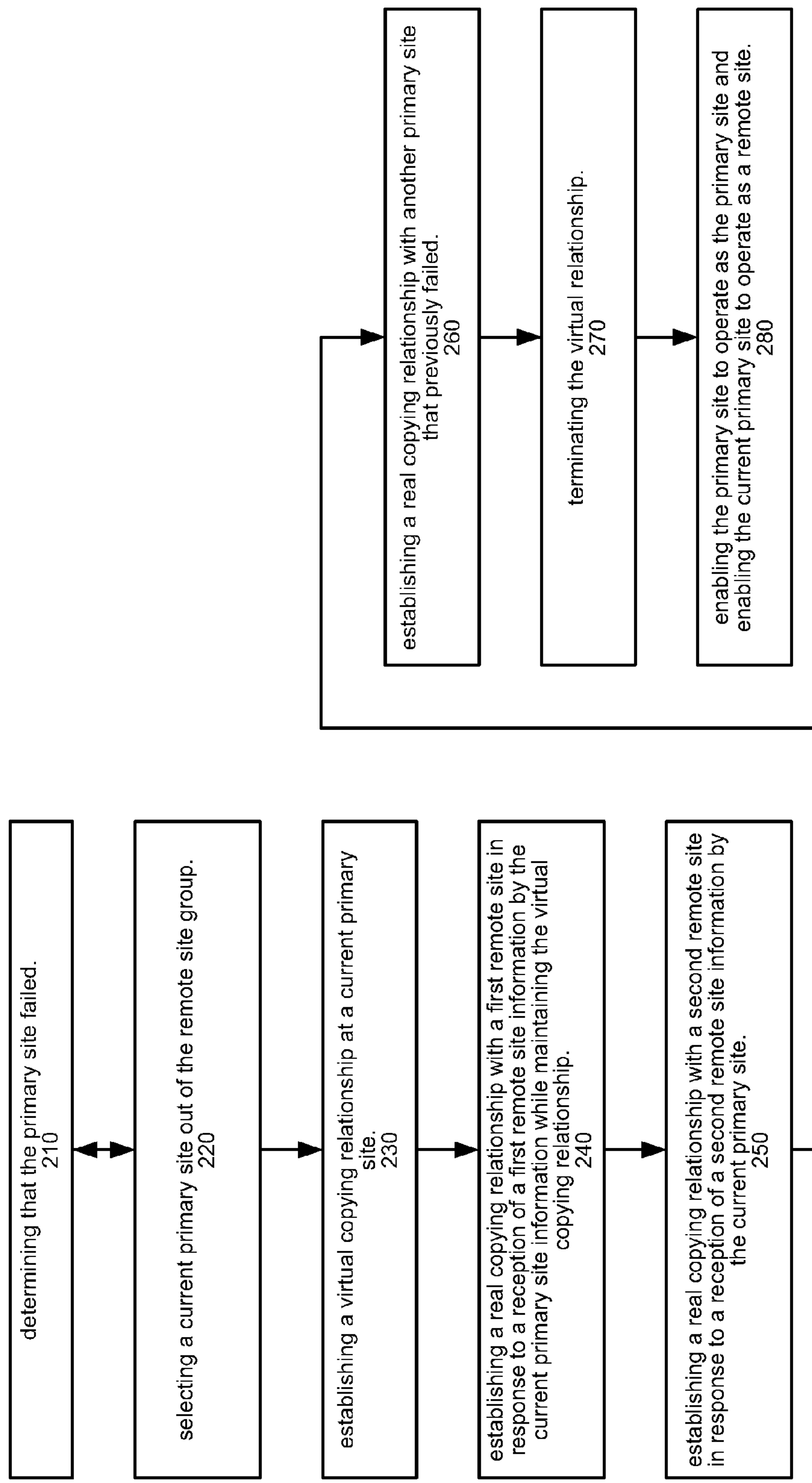
FIG. 8 illustrates a method for copying data, according to an embodiment of the invention.

FIG. 8 illustrates method 200 for copying data in a multiple remote site environment, according to an embodiment of the invention.

Method 200 starts by stage 210 of determining that a primary site failed. Before this failure the primary site maintained real mirror relations with multiple remote sites that can belong to a remote site group. The primary site can receive data from one or more data sources such as but not limited to a host computer.

It is noted that the determination (of said failure) can be responsive to a reception of a failure indication, as well as the absence of transmissions from the primary host. The determination can be made by the remote sites or by another component.

Stage 210 is followed by stage 220 of selecting a current primary site out of the remote site group. The selection can responsive to a predefined criteria. For example, the selected current primary site can be the primary site that was previously tagged as a potential current primary site. It is noted that the selection can be responsive to various parameters.

Stage 220 is immediately followed by stage 230 of establishing a virtual copying relationship at a current primary site. Conveniently, once this virtual copying relationship is established the current primary site can receive data from the data source. Accordingly, stage 230 can include sending the data source a data ready indication that indicates that the current primary site is ready to receive data.

Conveniently, stage 230 includes generating a first data structure that can indicate which data portions of the current primary site were altered after the primary site failed. Referring to FIG. 6 this data structure can be first data structure 110.

Conveniently, stage 230 is followed by a reception of an establish virtual copying relationship command. This command can be generated by the current primary site (for example upon detection of the primary site failure) or by another component.

Conveniently, stages 220 and 230 occur immediately after stage 210, but this is not necessarily so.

Stage 230 is followed by stage 240 of establishing a real copying relationship with a first remote site in response to a reception of a first remote site information (by the current primary site information) while maintaining the virtual copying relationship.

Conveniently, stage 240 includes generating a data structure that can indicate which data portions to copy from the current primary site to the first remote site. Referring to FIG. 6 this data structure can be second data structure 112.

Stage 240 is followed by stage 250 of establishing a real copying relationship with a second remote site in response to a reception of a second remote site information by the current primary site. Conveniently, the virtual copying relationship is maintained during stage 250. Referring to FIG. 6 this data structure can be third data structure 114.

It is further noted that stages 240 and 250 can occur in parallel, depending upon the time in which the current primary site has the first remote site and second remote site information. If, for example the current primary site has a first remote site information and a second remote site information when the primary site fails then stages 240 and 250 can be executed in parallel to stage 230 or slightly after stage 230 is executed.

It is noted that if the current primary site can be connected to a single remote site then method 200 does not includes stage 240. It is further noted that method 200 can include multiple stages of establishing real copying relationships, depending upon the number of remote sites.

Stage 250 is followed by stage 260 of establishing a real copying relationship with another primary site that previously failed. This stage occurs after the previously failed primary site recovers from the failure.

Stage 260 can be followed by stage 270 of terminating the virtual copying relationship. It is noted that the termination can follow a completion of a data transfer process from the current primary site to the primary site such that the primary site stores an most updated copy of the data stored at the current primary site.

Conveniently, stage 270 is executed after an establishment of real copying relationships with all the remote sites and with the primary site.

Stage 270 can be followed by stage 280 of enabling the primary site to operate as the primary site and enabling the current primary site to operate as a remote site.

Figure 9:
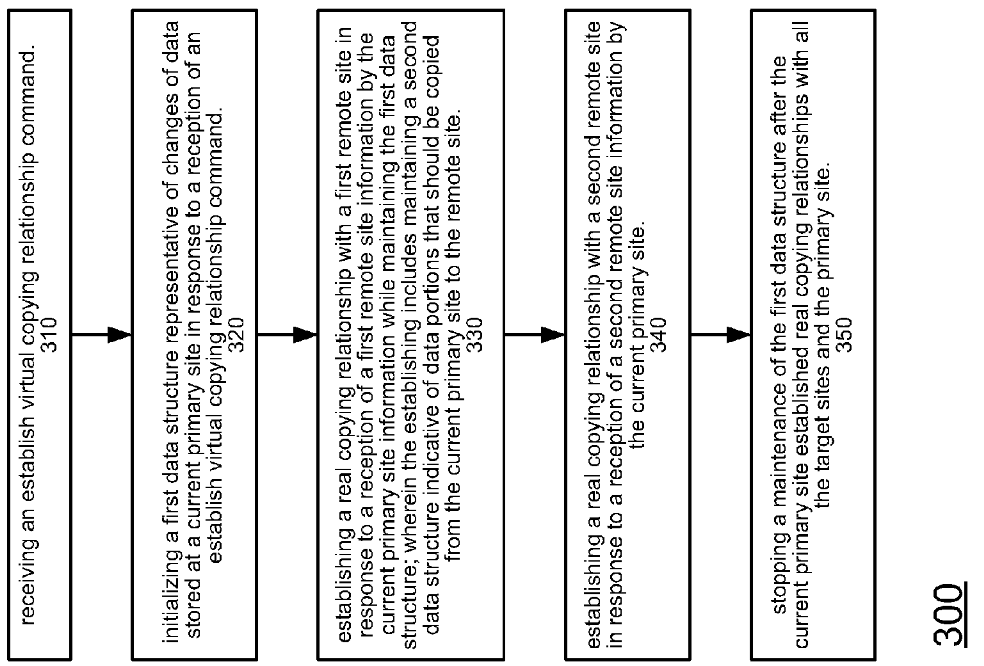
FIG. 9 illustrates a method for copying data, according to an embodiment of the invention.

FIG. 9 illustrates method 300 for copying data, according to an embodiment of the invention.

Method 300 starts by stage 310 of receiving an establish virtual copying relationship command. This establish virtual copying relationship command can be received after a primary site has failed, but this is not necessarily so.

Stage 310 is followed by stage 320 of initializing (conveniently but not necessarily immediately initializing) a first data structure representative of changes of data stored at a current primary site in response to a reception of an establish virtual copying relationship command.

Stage 320 is followed by stage 330 of establishing a real copying relationship with a first remote site in response to a reception of a first remote site information by the current primary site information while maintaining the first data structure; wherein the establishing includes maintaining a second data structure indicative of data portions that should be copied from the current primary site to the remote site.

Stage 330 can be followed by stage 340 of establishing a real copying relationship with a second remote site in response to a reception of a second remote site information by the current primary site.

Stage 340 is followed by stage 350 of stopping a maintenance of the first data structure after the current primary site established real copying relationships with all the target sites and the primary site.

Figure 10:
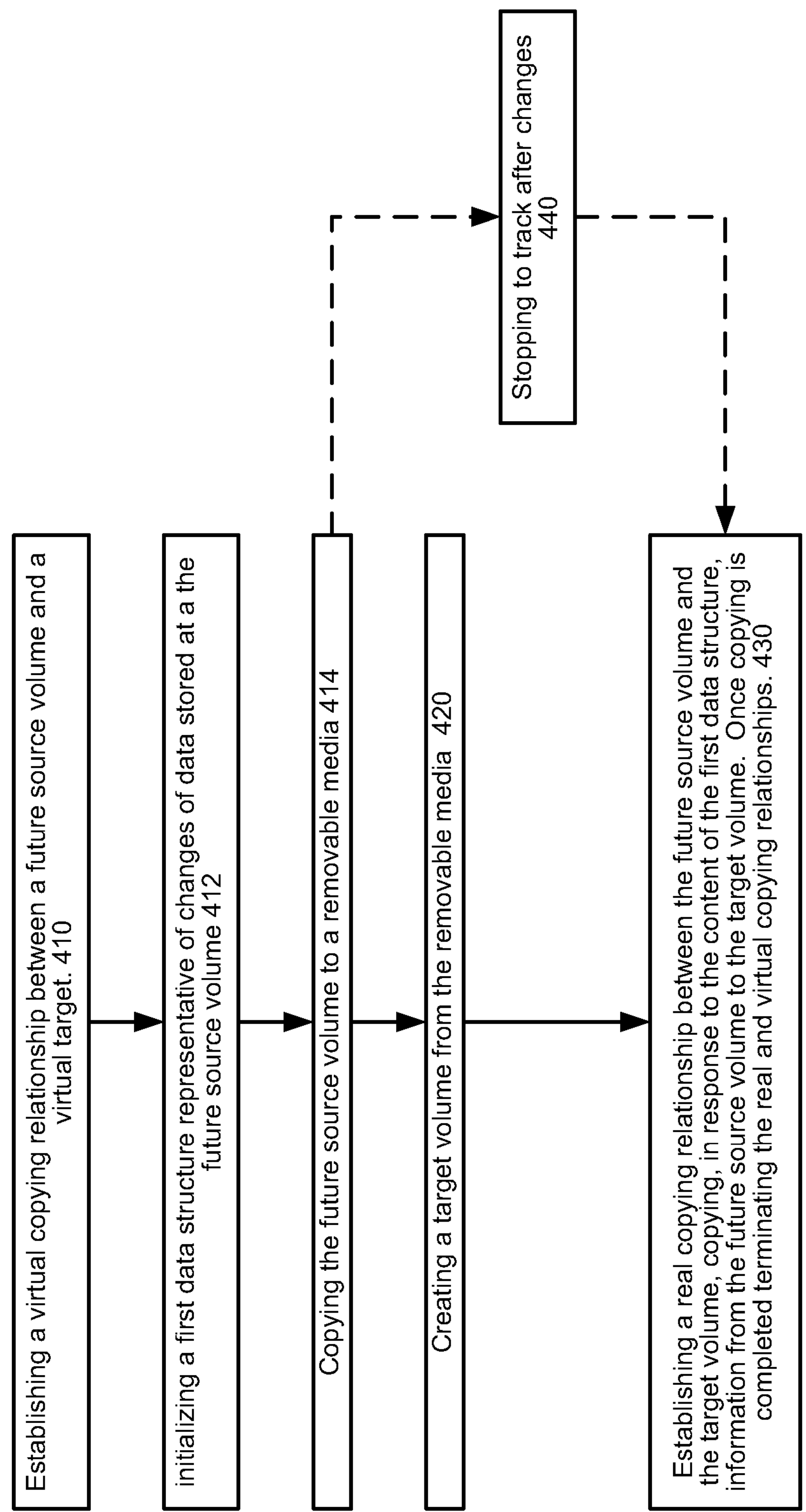
FIG. 10 illustrates a method for copying data, according to an embodiment of the invention

FIG. 10 illustrates method 400 for copying data, according to an embodiment of the invention.

Method 400 starts by stage 410 of establishing a virtual copying relationship between a future source volume (that may be a primary site or may be included in a primary site) and between a virtual target.

Stage 410 is followed by stage 412 of initializing a first data structure that is representative of changes in the data stored at the future source volume.

Stage 412 is followed by stage 414 of copying the future source volume to a removable media (such as a tape). Stage 414 is followed by stage 420 of creating a target volume from the removable media.

Stage 420 is followed by stage 430 of establishing a real copying relationship between the future source volume and the target volume, and copying, in response to the content of the first data structure, information from the future source volume to the target volume. This stage can start when the details (for example logical address) of the target volume is known to the future source volume.

It is noted that method 400 can include stage 440 of stopping to track after changes, and associating the data of the future source volume with a certain point in time. Stage 440 is illustrated as following stage 414 and preceding stage 430, but this is not necessarily so.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Variations, modifications, and other implementations of what is described herein will occur to those of ordinary skill in the art without departing from the spirit and the scope of the invention as claimed.

Accordingly, the invention is to be defined not by the preceding illustrative description but instead by the spirit and scope of the following claims.

We claim:

1. A method for copying data, the method comprises:

establishing a virtual copying relationship at a current primary site so as to track changes in the data at the current primary site before receiving, at the current primary site, first remote site information identifying a first remote site to which the data are to be copied; and establishing a real copying relationship with the first remote site, using the tracked changes, in response to a reception of the first remote site information by the current primary site while maintaining the virtual copying relationship.

2. The method according to claim 1 further comprising establishing a real copying relationship with a second remote site in response to a reception of a second remote site information by the current primary site.

3. The method according to claim 1 wherein the establishing a virtual copying relationship comprises tracking changes of data stored in the current primary site.

4. The method according to claim 1 wherein the establishing a real copying relationship with a remote site is followed by tracking changes of data stored in the current primary site that occur after the establishment of the real copying relationship.

5. The method according to claim 1 wherein the establishing of a virtual copying relationship at a current primary site is responsive to a reception of an establish virtual copying relationship command.

6. A method for copying data, the method comprises:

establishing a virtual copying relationship at a current primary site;

establishing a real copying relationship with one or more target sites in response to a reception of target site information by the current primary site information while maintaining the virtual copying relationship; and terminating the virtual copying relationship after the current primary site establishes real copying relationships with all the target sites.

7. A method for copying data, the method comprises:

establishing a virtual copying relationship at a current primary site; and establishing a real copying relationship with a first remote site in response to a reception of a first remote site information by the current primary site information while maintaining the virtual copying relationship, wherein the virtual copying relationship is established immediately after another primary site fails.

8. The method according to claim 7 further comprising establishing a real copying relationship with the other primary site after the other primary site recovers.

9. A method for copying data, the method comprises:

initializing, in response to a reception of an establish virtual copying relationship command, a first data structure representative of changes of data stored at a current primary site so as to track changes in the data at the current primary site before receiving, at the current primary site, first remote site information identifying a first remote site to which the data are to be copied; and establishing a real copying relationship with the first remote site, using the tracked changes, in response to a reception of the first remote site information while maintaining the first data structure;

wherein the establishing comprises maintaining a second data structure indicative of data portions that should be copied from the current primary site to the first remote site.

10. The method according to claim 9 further comprising establishing a real copying relationship with a second remote site in response to a reception of a second remote site information.

11. A method for copying data, the method comprises:

initializing, in response to a reception of an establish virtual copying relationship command, a first data structure representative of changes of data stored at a current primary site; and establishing a real copying relationship with a first remote site in response to a reception of a first remote site information while maintaining the first data structure;

wherein the establishing comprises maintaining a second data structure indicative of data portions that should be copied from the current primary site to the first remote site, further comprising stopping maintenance of the first data structure after the virtual copying relationship is terminated.

12. A system for copying data, the system comprises a current primary site, wherein the current primary site comprises a controller coupled to at least one storage unit;

wherein the controller is adapted to establish a virtual copying relationship so as to track changes in the data at the current primary site before receiving, at the current primary site, first remote site information identifying a first remote site to which the data are to be copied, and to establish a real copying relationship with the first remote site, using the tracked changes, in response to a reception of the first remote site information by the current primary site while maintaining the virtual copying relationship.

13. The system according to claim 12 wherein the current primary site is adapted to establish a real copying relationship with a second remote site in response to a reception of a second remote site information by the current primary site.

14. The system according to claim 12 wherein the current primary site is adapted to track changes of data stored in the at least one storage unit of the current primary site that occur after an establishment of the virtual copying relationship.

15. The system according to claim 12 wherein the current primary site is adapted to track changes of data stored in the current primary site that occur after an establishment of the real copying relationship.

16. The system according to claim 12 wherein the current primary site is adapted to establish the virtual copying relationship in response to a reception of an establish virtual copying relationship command.

17. A system for copying data, the system comprises a current primary site, wherein the current primary site comprises a controller coupled to at least one storage unit;

wherein the controller is adapted to establish a virtual copying relationship, and to establish a real copying relationship with one or more target sites in response to a reception of target site information by the current primary site information while maintaining the virtual copying relationship, wherein the current primary site is adapted to terminate the virtual copying relationship after establishing real copying relationships with all the target sites.

18. A system for copying data, the system comprises a current primary site, wherein the current primary site comprises a controller coupled to at least one storage unit;

wherein the controller is adapted to establish a virtual copying relationship, and to establish a real copying relationship with a first remote site in response to a reception of a first remote site information by the current primary site information while maintaining the virtual copying relationship, wherein the controller is adapted to establish the virtual copying relationship immediately after another primary site fails.

19. The system according to claim 18 wherein the current primary site is adapted to establish a real copying relationship with the other primary site after the other primary site recovers.

20. A system for copying data, the system comprises a current primary site, wherein the current primary site comprises a controller coupled to at least one storage unit;

wherein the controller is adapted to initialize a first data structure representative of changes of data stored at a current primary site in response to a reception of an establish virtual copying relationship command so as to track changes in the data at the current primary site before receiving, at the current primary site, first remote site information identifying a first remote site to which the data are to be copied; and to establish a real copying relationship with the first remote site, using the tracked changes, in response to a reception of the first remote site information by the current primary site information while maintaining the first data structure;

wherein the establishing comprises maintaining a second data structure indicative of data portions that should be copied from the current primary site to the remote site.

21. The system according to claim 20 wherein the current primary site is adapted to establish a real copying relationship with a second remote site in response to a reception of a second remote site information by the current primary site.

22. A system for copying data, the system comprises a current primary site, wherein the current primary site comprises a controller coupled to at least one storage unit;

wherein the controller is adapted to initialize a first data structure representative of changes of data stored at a current primary site in response to a reception of an establish virtual copying relationship command; and to establish a real copying relationship with one or more target sites in response to a reception of target site information by the current primary site information while maintaining the first data structure;

wherein the establishing comprises maintaining a second data structure indicative of data portions that should be copied from the current primary site to the target sites; and wherein the current primary site is adapted to stop a maintenance of the first data structure after the current primary site establishes real copying relationships with all the target sites.

23. A computer program product comprising a computer usable medium storing a computer readable program, wherein the computer readable program when executed on a computer causes the computer to: establish a virtual copying relationship at a current primary site so as to track changes in the data at the current primary site before receiving, at the current primary site, first remote site information identifying a first remote site to which the data are to be copied, and establish a real copying relationship with the first remote site, using the tracked changes, in response to a reception of the first remote site information by the current primary site while maintaining the virtual copying relationship.

24. The computer program product according to claim 23, wherein the computer readable program when executed on a computer causes the computer to establish a real copying relationship with a second remote site in response to a reception of a second remote site information by the current primary site.

25. The computer program product according to claim 23, wherein the computer readable program when executed on a computer causes the computer to track changes of data stored in the current primary site.

26. The computer program product according to claim 23, wherein the computer readable program when executed on a computer causes the computer to track changes of data stored in the current primary site that occur after the establishment of the real copying relationship.

27. The computer program product according to claim 23, wherein the computer readable program when executed on a computer causes the computer to establish a virtual copying relationship at a current primary site in response to a reception of an establish virtual copying relationship command.

28. The computer program product according to claim 23, wherein the computer readable program when executed on a computer causes the computer to terminate the virtual copying relationship after an establishment of real copying relationships between the current primary site with all of one or more target sites.

29. The computer program product according to claim 23, wherein the computer readable program when executed on a computer causes the computer to establish a virtual copying relationship at a current primary site immediately after another primary site fails.

30. The computer program product according to claim 29, wherein the computer readable program when executed on a computer causes the computer to establish a real copying relationship with the other primary site after the other primary site recovers.

* * * * *